(12) United States Patent
Calico

(10) Patent No.: US 7,155,804 B2
(45) Date of Patent: Jan. 2, 2007

(54) METHOD OF FORMING AN ELECTRIC MOTOR

(75) Inventor: John M. Calico, Marietta, GA (US)

(73) Assignee: Moog Inc., East Aurora, NY (US)

( * ) Notice: Subject to any disclaimer, the term of this patent is extended or adjusted under 35 U.S.C. 154(b) by 156 days.

(21) Appl. No.: 10/667,014

(22) Filed: Sep. 17, 2003

(65) Prior Publication Data

US 2005/0057114 A1     Mar. 17, 2005

(51) Int. Cl.
*H02K 15/00* (2006.01)
(52) U.S. Cl. .............................. 29/596; 29/598; 29/606; 29/607; 29/609; 310/42; 310/49 A; 310/257
(58) Field of Classification Search .................. 29/596, 29/598, 606, 607, 609; 310/42, 49 A, 257
See application file for complete search history.

(56) References Cited

U.S. PATENT DOCUMENTS 5,592,731 A * 1/1997 Huang et al. .................. 29/596
6,167,610 B1 * 1/2001 Nakahara et al. ............. 29/596
6,232,681 B1 * 5/2001 Johnston et al. .............. 310/44
6,265,804 B1 * 7/2001 Nitta et al. .................. 310/259

\* cited by examiner

*Primary Examiner*—A. Dexter Tugbang
*Assistant Examiner*—Tim Phan
(74) *Attorney, Agent, or Firm*—Phillips Lytle LLP

(57) ABSTRACT

A stator is provided for an electrical device (e.g., a motor) comprised of one or more stator segments formed by the compaction of one or more powdered metallic materials. Each stator section has at least one tooth that forms a substantially toroidal path for magnetic flux entering and leaving the stator segment. Each stator segment also has a continuous insulated electrical winding that is associated with the stator segment such that a magnetic field is induced in the stator segment when a current is passed through the continuous insulated electrical winding. The current that is passed through the continuous insulated electrical winding of any one stator segment is not of the same electrical phase as the current that is passed through the winding of any adjacent stator segment.

5 Claims, 11 Drawing Sheets

FRONT VIEW

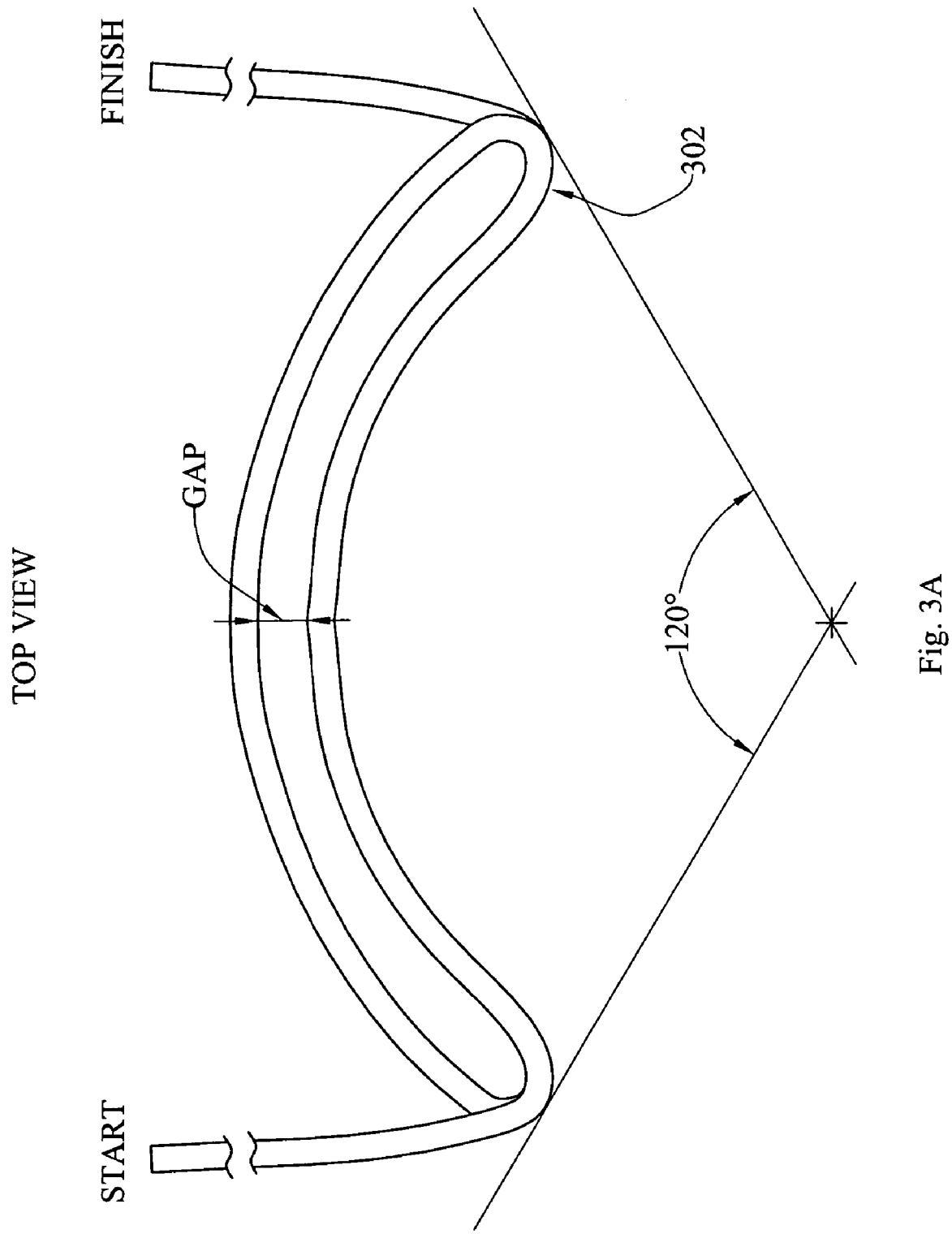

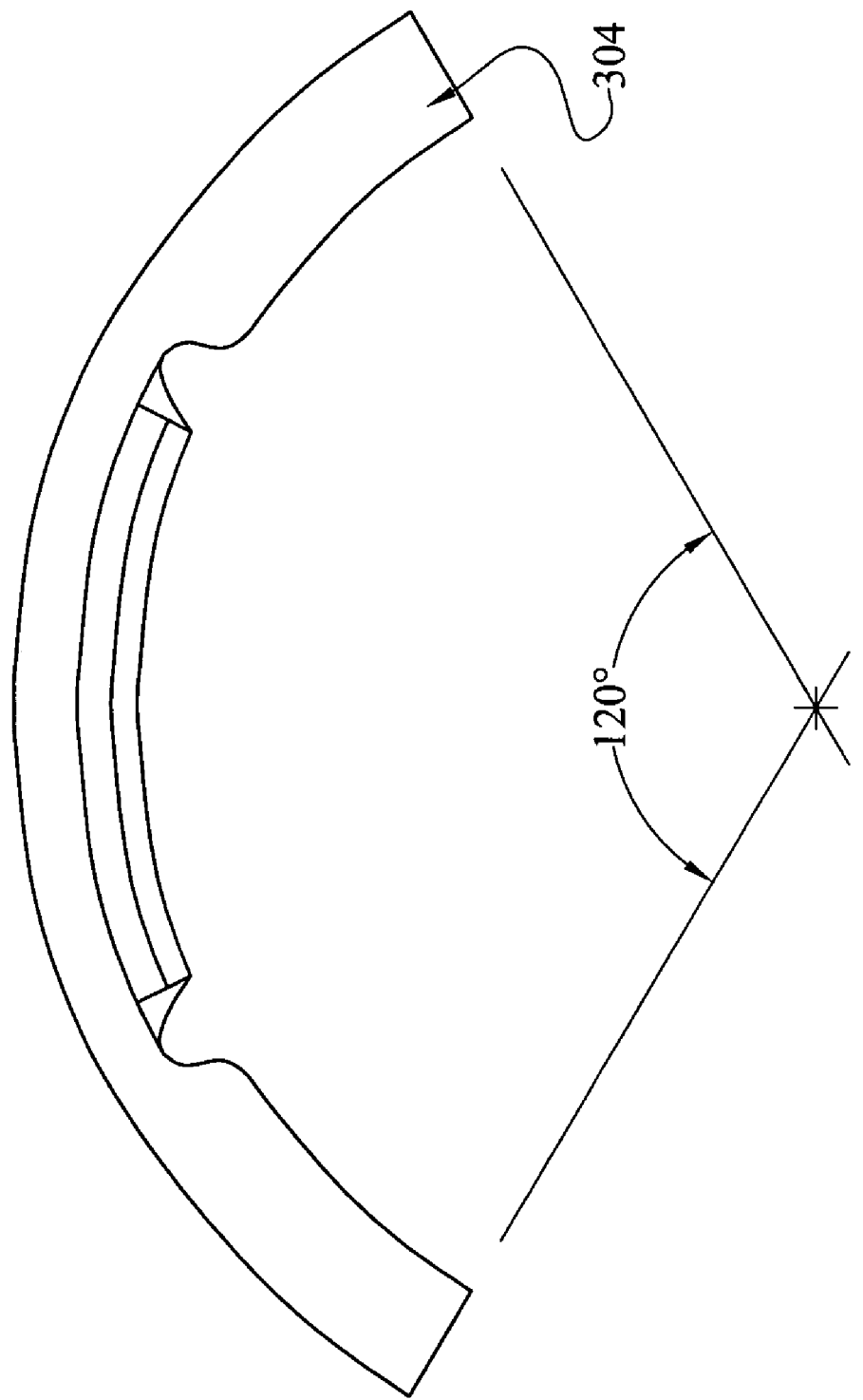

METHOD OF FORMING AN ELECTRIC MOTOR

BACKGROUND OF THE INVENTION

1. Field of the Invention

The invention pertains to stators for electric motors. It specifically pertains to uniquely designed stators formed by compaction of powdered metallic materials.

2. Description of Related Art

Generally, a brushless dc motor is comprised of a rotor, a stator, windings and a body with endplates to hold the assembly in place. The rotor is generally comprised of a shaft, a magnetic return path and a permanent magnet. A brushless dc motor also has a stator comprised of electrical windings (usually insulated copper windings) that are wound on or embedded into a core material such that once the windings are energized, a magnetic field is formed that interacts with the magnetic field of the permanent magnet of the rotor in a manner such that torque and subsequent rotation is produced in the rotor. Generally, in many embodiments of electric motors, the stator member is cylindrical in shape wherein the rotor member is placed within the stator and held in place by the endplates and bearings. An air gap exists between the outer surface of the rotor and the inner surface of the stator. Electric current is introduced into the windings of the stator such that the stator's core material forms a magnetic path for a magnetic field that simulates rotation about the stator. In other embodiments, the rotor may be fixed with the stator rotating about the rotor.

Stators of the type described above are generally formed by producing thin laminations of high permeability material comprised of a number of alternating teeth and slots that form the inner circumference of the cylinder and an outer yoke material the holds the teeth in position. The thin plates have a thin coat of insulation on their exterior and are stacked together to form the hollow cylinder of the desired dimensions. Insulated electrical windings are then placed in the slots alongside the teeth to form the magnetic field when a current is introduced into the windings. In other known embodiments, similarly shaped stator members may be formed by dynamic magnetic compaction (DMC) with the windings either embedded in the stator material or wound about the stator's teeth after formation of the stator.

Various electrical components such as rotors and stators have been formed using DMC. DMC generally involves metallic powders that are placed into a conductive container. The conductive container is then placed within an electrical coil or otherwise exposed to a magnetic field that is created by an electrical current passing through a conductor. A large current is pulsed through the electrical coil thus creating a very strong magnetic field. This magnetic field will collapse the conductive container and compact the metallic powders into a solid object. U.S. Pat. Nos. 5,405,574; 5,611,139; 5,611,230; 5,689,797; 6,273,963 and 6,432,554 (all assigned to IAP Research, Inc.), each fully incorporated herein and made a part hereof, disclose methods of dynamic magnetic compaction and are related to the formation of electrical components. DMC allows the formation of components of various shapes. DMC also reduces production time as electrical windings may be incorporated into a component during the formation process. Furthermore, DMC produced components may have more efficient magnetic circuits than that of components produced by other means because of the ability of the DMC process to compact the material to nearly full density.

For example, U.S. Pat. No. 5,405,574, "Method for Compaction of Powder-Like Materials," was issued to Chelluri et al. on Apr. 11, 1995 from an application filed on Feb. 10, 1992 and is assigned to IAP Research, Inc. This patent is generally directed toward the DMC process and describes methods of producing a wire-like electrically conductive body comprising dense highly compacted particulate material, methods of producing an electrically conductive member, and methods of producing highly dense body superconductive materials.

U.S. Pat. No. 5,611,139, "Structure and Method for Compaction of Powder-Like Material," issued to Chelluri et al. on Mar. 18, 1997 from an application filed on Apr. 6, 1995 as a continuation-in-part of an application filed Feb. 10, 1992 that issued as U.S. Pat. No. 5,405,574. This patent is assigned to IAP Research, Inc. It is directed toward structures and devices that utilize dynamic magnetic compaction of powdered material to form high-density bodies of varying shapes and sizes such as rods, tapes, tubes, plates, wheels, etc.

U.S. Pat. No. 5,611,230, "Structure and Method for Compaction of Powder-Like Material," issued to Chelluri et al. on Mar. 18, 1997 from an application filed on Jan. 3, 1995 as a division of an application filed Feb. 10, 1992 that issued as U.S. Pat. No. 5,405,574. This patent is assigned to IAP Research, Inc. This patent is generally directed toward the DMC process and again describes a system for producing a body of dense highly compacted particulate material.

U.S. Pat. No. 5,689,797, "Structure and Method for Compaction of Powder-Like Materials," issued on Nov. 18, 1997 to Chelluri et al. from an application filed Apr. 6, 1995 as a continuation-in-part of an application filed Feb. 10, 1992 that issued as U.S. Pat. No. 5,405,574. This patent is assigned to IAP Research, Inc. This patent is also generally directed toward DMC and producing bodies, including annular bodies, from powdered materials through DMC.

U.S. Pat. No. 6,273,963, "Structure and Method for Compaction of Powder-Like Materials," issued on Aug. 14, 2001 to Barber from an application filed on Jul. 29, 1996 as a continuation-in-part of an application filed on Jan. 3, 1995, now U.S. Pat. No. 5,611,230. A divisional application claiming priority upon this patent has also been filed and was published on Dec. 13, 2001 as U.S. patent application Publication No. 2001/0051104. Both the patent and the published application are assigned to IAP Research, Inc. The patent and the published application disclose "over-pressuring" a powdered material through DMC to densify the material to over 90 percent of its maximum density.

U.S. Pat. No. 6,156,264, "Electromagnetic Compacting of Powder Metal for Ignition Core Application," issued to Johnston et al. on Dec. 5, 2000 from an application filed on Oct. 6, 1999. It is assigned to Delphi Technologies, Inc. and is fully incorporated herein and made a part hereof. The patent generally discloses a process for producing a cylindrical electromagnetic core by exposing powdered metals to an electromagnetic field. Among the parts fabricated according to this patent are AC cylindrical electromagnetic parts, such as AC cylindrical electromagnetic ignition coil cores.

U.S. Pat. No. 6,432,554, "Apparatus and Method for Making an Electrical Component," issued to Barber et al. on Aug. 13, 2002 from an application filed on Feb. 15, 2000 as a continuation-in-part of an application filed on Jul. 29, 1996, now issued as U.S. Pat. No. 6,273,963. A continuation application has also been filed that was published on Aug. 12, 2002 as U.S. patent application Publication No. 2002/0192103. The patent and published application are assigned to IAP Research, Inc. This patent and published application disclose systems and methods wherein powdered materials are placed in a conductive container along with an electrically insulated coil and subjected to DMC to produce a component part, such as a transformer, choke, rotor or stator for an electric motor and the like, with an embedded electrically insulated coil.

U.S. Pat. No. 6,232,681, "Electromagnetic Device with Embedded Windings and Method for its Manufacture," issued on May 15, 2001 to Johnston et al. from an application filed on Mar. 23, 2000. A divisional application claiming priority upon this patent has also been filed and was published on Jan. 17, 2002 as U.S. patent application Publication No. 2002/0005675. The patent and published application are assigned to Delco Remy International, Inc. The patent is incorporated herein and made a part hereof. The patent and published application disclose a stator core with embedded stator windings manufactured using DMC with radial compaction techniques. The patent and published application also describe a method of fabricating an electromagnetic device, such as a stator, with embedded windings.

U.S. Pat. No. 6,362,544, "Electromagnetic Device with Embedded Windings and Method for Manufacture," issued to Johnston et al. on Mar. 26, 2002 from an application filed on Apr. 30, 2001 as a continuation of an application filed on March 23, 2002, now issued as U.S. Patent No. 6,232,681. It is assigned to Delco Remy International, Inc. and is fully incorporated herein and made a part hereof. It describes a cylindrical electromagnetic device with embedded insulated windings comprised of radially compacted powdered magnetic materials.

Other known references related to DMC include U.S. patent application Publication No. 2002/0036367, "Method for Producing & Manufacturing Density Enhanced, DMC, Bonded Permanent Magnets," filed by Walmer et al. on Feb. 13, 2001 as a non-provisional application of a provisional application filed on February 22, 2000. In addition, U.S. patent application Publication No. 2002/0043301, "Density Enhanced DMC, Bonded Permanent Magnets," filed by Walmer et al. on Feb. 13, 2001 as a non-provisional application of a provisional application filed on Feb. 22, 2000. Both applications were published on Apr. 18, 2002. Each application discloses a DMC method for producing stable, dense, bonded permanent magnets where the binder is inorganic or organic with up to about a 40 percent increase in magnetic saturation performance over magnets formed by traditional methods.

U.S. patent application Publication No. 2002/0117907, "Electromagnetic Pressing of Powder Iron for Stator Core Applications," filed Feb. 27, 2001 by Gay et al. It was published on Aug. 29, 2002. It discloses a stator core for an electric motor made of compacted powder material with each particle electrically insulated from one another. For example, the published application describes a stator core to have a density of 98 percent of its theoretical density. The published application also describes methods of manufacturing such a stator core.

As shown above, many electromagnetic devices formed by DMC and methods of forming such devices through DMC are disclosed in existing documents. Specifically, most conventional art discloses the use of DMC to form electromagnetic parts such as stators, rotors, inductors and transformers that contain embedded insulated windings. The documents referenced above also disclose stators or rotors with embedded electrically insulated windings or shapes formed of magnetic material through the DMC process; however, conventional stators, whether formed of a series of plates, traditional compaction techniques or by DMC, are generally devices with two-dimensional (non-axial) flux paths having complex winding patterns that require significant motor assembly and manufacturing resources.

Thus, an unsatisfied need exists for an improved stator and methods of manufacture that overcomes deficiencies in the conventional art, some of which are discussed above.

BRIEF SUMMARY OF THE INVENTION

Therefore, what is needed is a uniquely dimensioned stator for an electric motor with a three-dimensional flux path and methods of forming such a stator by compaction techniques, including DMC techniques. Compaction techniques and insulated ferrite powders provide a means to form an efficient uniquely dimensioned stator that may benefit the motor assembly and manufacturing process.

An embodiment of the present invention is a unique stator member component for an electric motor that provides a three-dimensional flux path in order to provide a simplified winding pattern for the stator member of the embodiments of the invention. Another aspect of this invention is such a stator produced with materials and by methods whereby the motor's performance is increased and the cost of producing the stator is decreased. One embodiment of this invention is a stator for a brushless dc machine, although embodiments of the invention may be utilized in other motors and devices utilizing a stator.

One embodiment of this invention is a stator comprised of at least two stator segments having at least one tooth on each of said stator segments. The tooth forms a path for magnetic flux entering and leaving the stator segment. A continuous insulated electrical winding that is associated with each stator segment such that a magnetic field is induced in the stator segment when a current is passed through the continuous insulated electrical winding. As such, one or more of the stator segments form the stator for an electric device and the current that is passed through the continuous insulated electrical winding of any one stator segment is of a single electrical phase. A stator of this design has a simplified wiring scheme as compared to a conventional wound stator.

Another embodiment of this invention is a stator comprised of one or more stator segments formed by the compaction of one or more powdered metallic materials and having at least one tooth on each of the stator segments. The tooth forms a substantially toroidal path for magnetic flux entering and leaving the stator segment. Each stator segment is also comprised of a continuous insulated electrical winding that is associated with each stator segment such that a magnetic field is induced in the stator segment when a current is passed through the continuous insulated electrical winding. The current that is passed through the continuous insulated electrical winding of any one stator segment is of a single electrical phase. A stator of this design has a simplified wiring scheme as compared to a conventional wound stator.

Another embodiment of this invention is an electric motor having a stator comprised of one or more stator segments having substantially toroidal magnetic flux paths. This electric motor embodiment is comprised of a stator having one or more stator segments with each stator segment having one or more teeth and a continuous insulated electrical winding associated with said stator segment. Each stator segment is formed by compaction of a powdered metallic material that provides a substantially toroidal path for magnetic flux and the continuous insulated electrical winding of each stator segment is connected to an electrical phase that is not the same as the electrical phase connected to the continuous insulated electrical winding of an adjacent stator segment. Each tooth of a stator segment forms a path for magnetic flux entering and leaving the stator segment. The motor of this embodiment also includes a rotor having at least two magnetic poles. An electric motor of this design generally has an improved torque constant and an improved motor constant over comparable electric motors having conventional stators.

Another embodiment of this invention is a permanent magnet dc electric motor comprised of a stator with at least three stator segments with each stator segment having at least three teeth. A continuous, insulated electrical winding is associated with each stator segment. Each stator segment is formed by compaction of a powdered metallic material by dynamic magnetic compaction and provides a substantially toroidal path for magnetic flux. The continuous insulated electrical winding of each stator segment is connected to an electrical phase that is not the same as the electrical phase connected to the continuous insulated electrical winding of an adjacent stator segment. Each tooth of a stator segment forms a path for magnetic flux entering and leaving the stator segment. The motor of this embodiment is also comprised of a rotor having at least two permanent magnet magnetic poles. Compacting one or more materials about a shaft by dynamic magnetic compaction forms this rotor. A permanent magnet dc electric motor of this design generally has an improved torque constant and an improved motor constant over comparable permanent magnet dc electric motors having conventional stators.

Yet another embodiment of this invention is a method of forming a stator comprising the steps of 1) placing one or more powdered metallic core materials into a die; and 2) compacting the powdered metallic core materials into one or more stator segments with each segment having one or more teeth that form a substantially toroidal path for magnetic flux to enter or exit the stator segment.

Another embodiment of the invention involves a method of forming an electric motor comprising the steps of 1) compacting one or more powdered metallic materials to form a stator element having one or more stator segments, each stator segment having one or more teeth that form a substantially toroidal path for magnetic flux entering or exiting the stator segment and each stator segment having an associated continuous insulated electric winding for forming a magnetic field within the stator segment when said winding is electrically energized; and 2) placing a rotor capable of producing a second magnetic field having at least two magnetic poles in a cooperative relationship with the stator such that magnetic poles of the rotor interact with the magnetic field within the stator element.

BRIEF DESCRIPTION OF THE SEVERAL VIEWS OF THE DRAWINGS

Figure 1A:
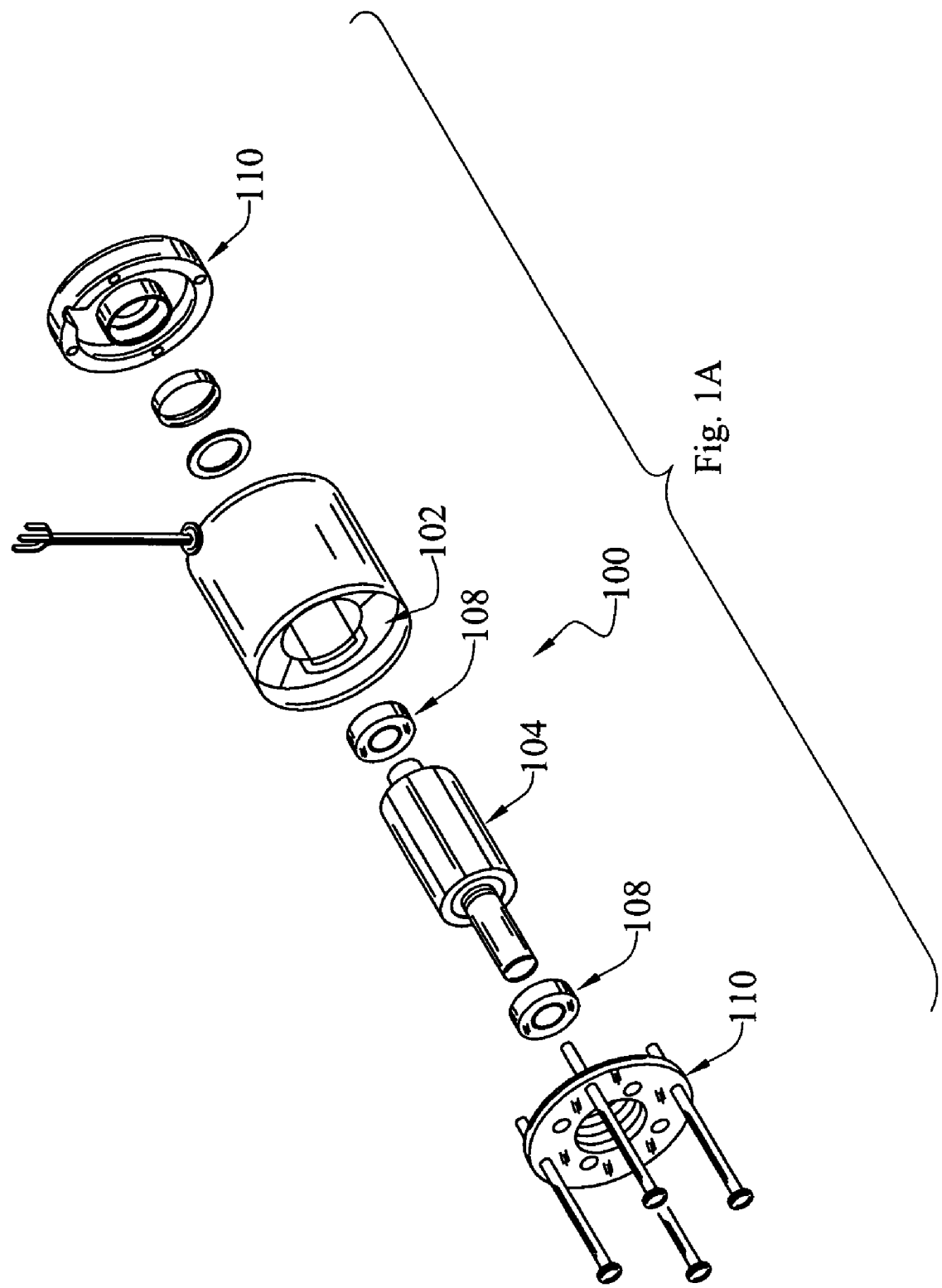
Figure 1B:
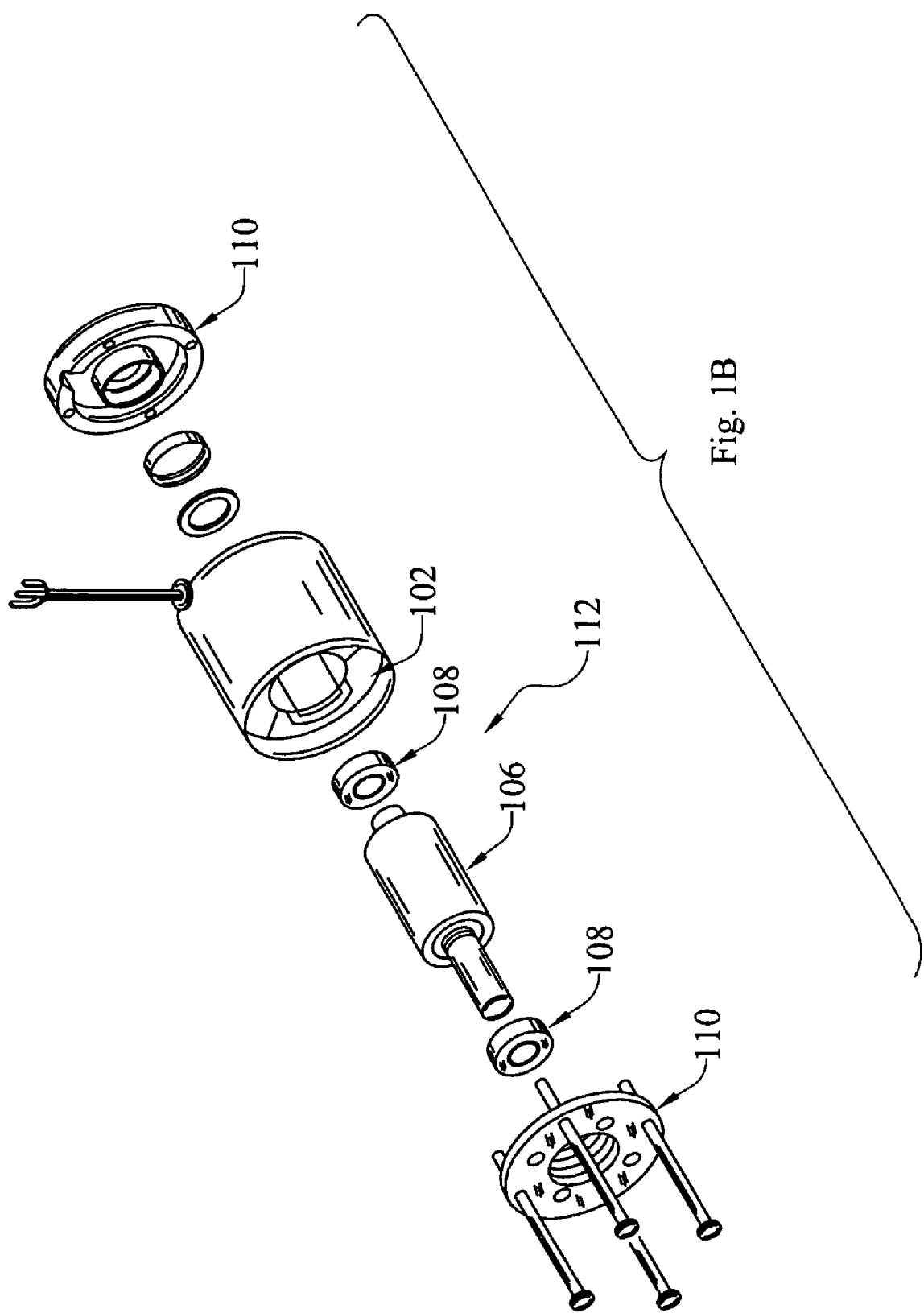
Figure 2:
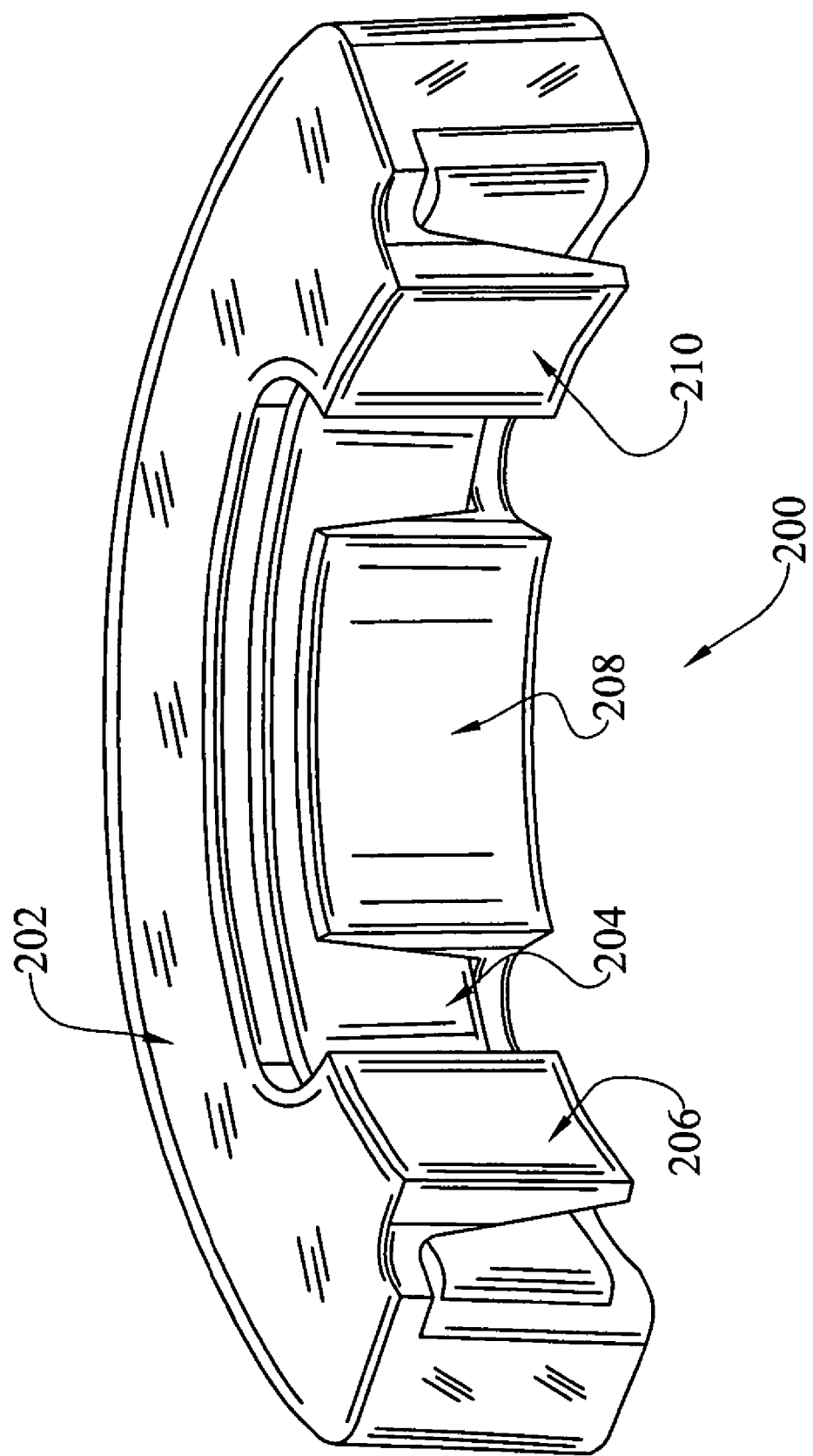
Figure 3B:
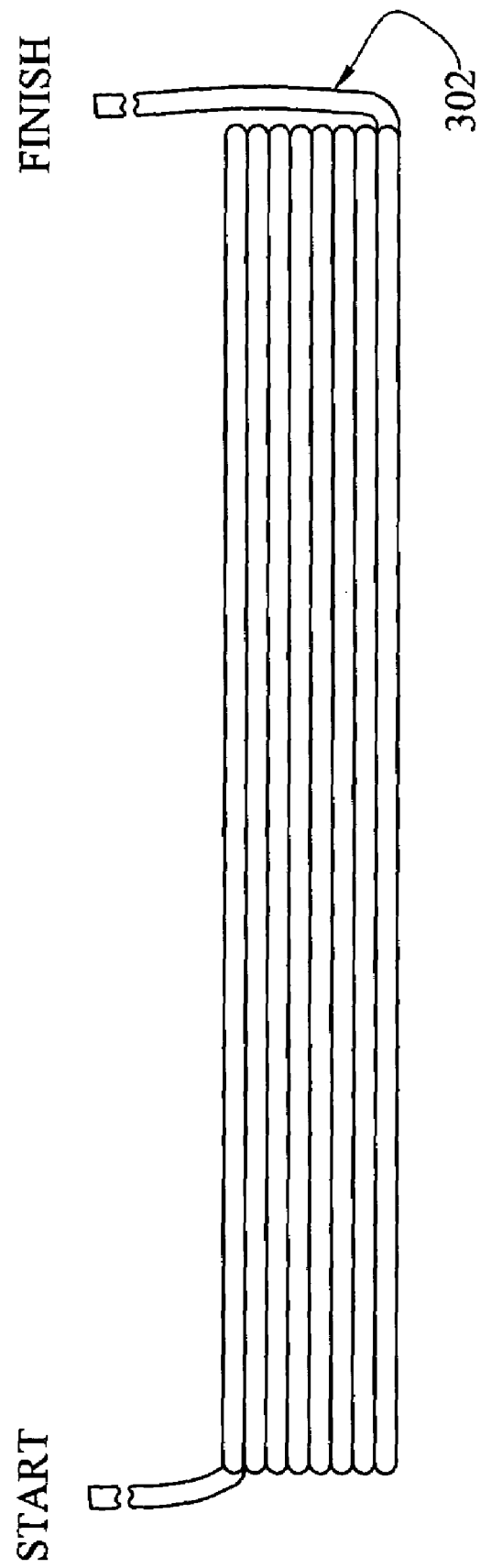
Figure 3D:
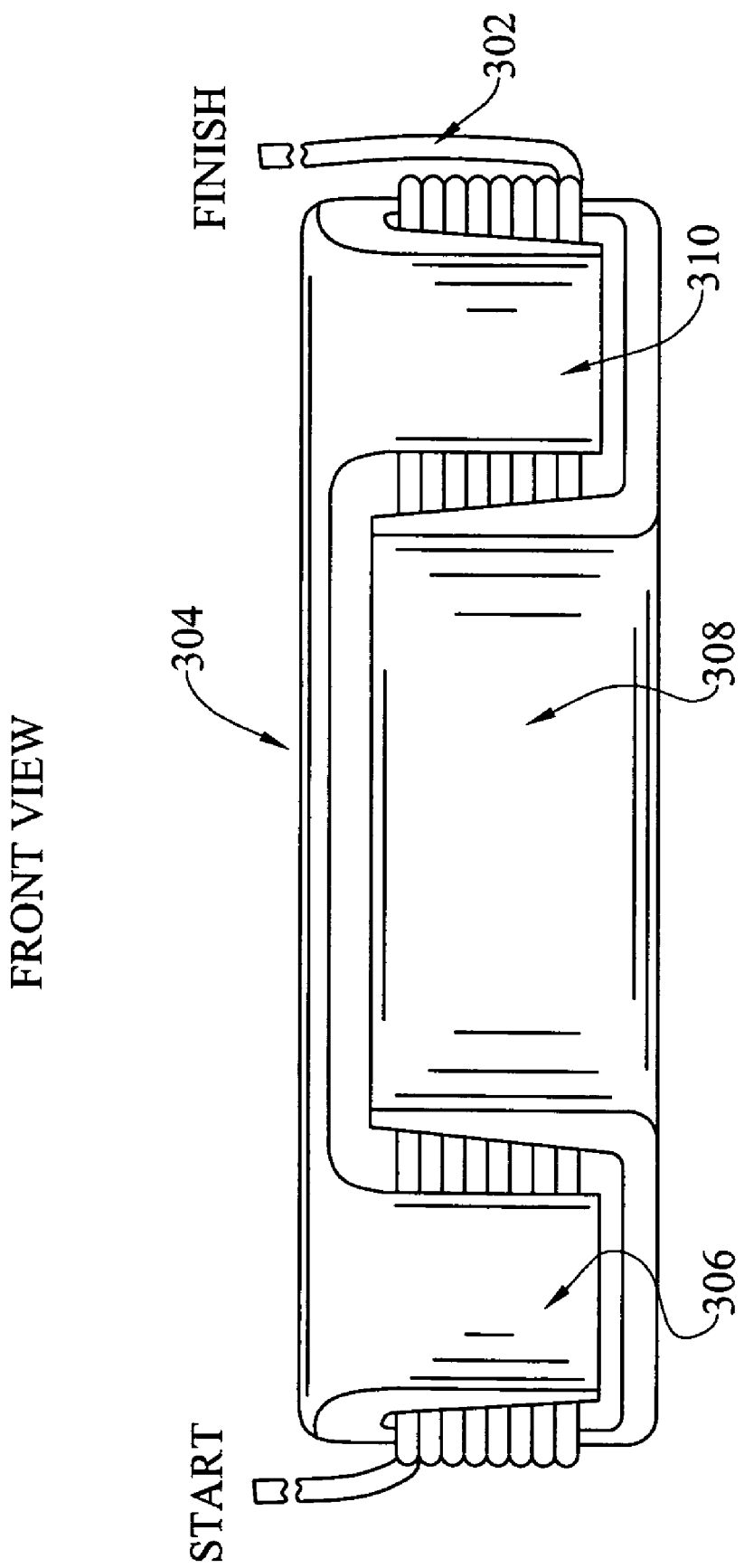
Figure 4:
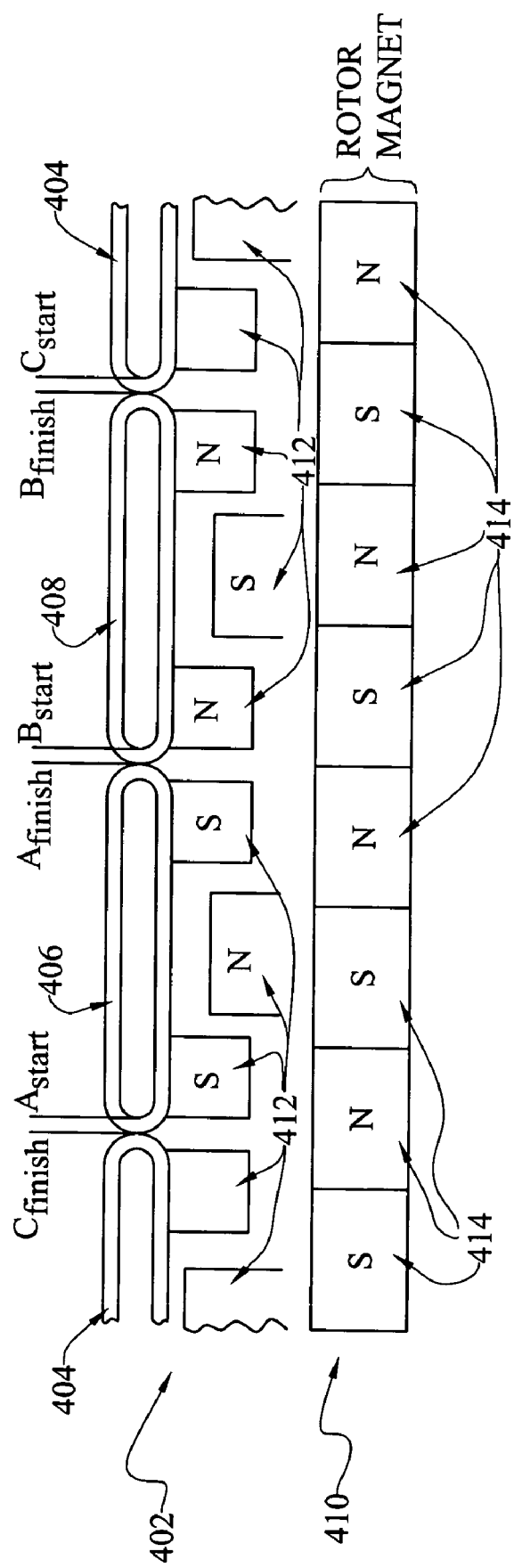
Figure 5:
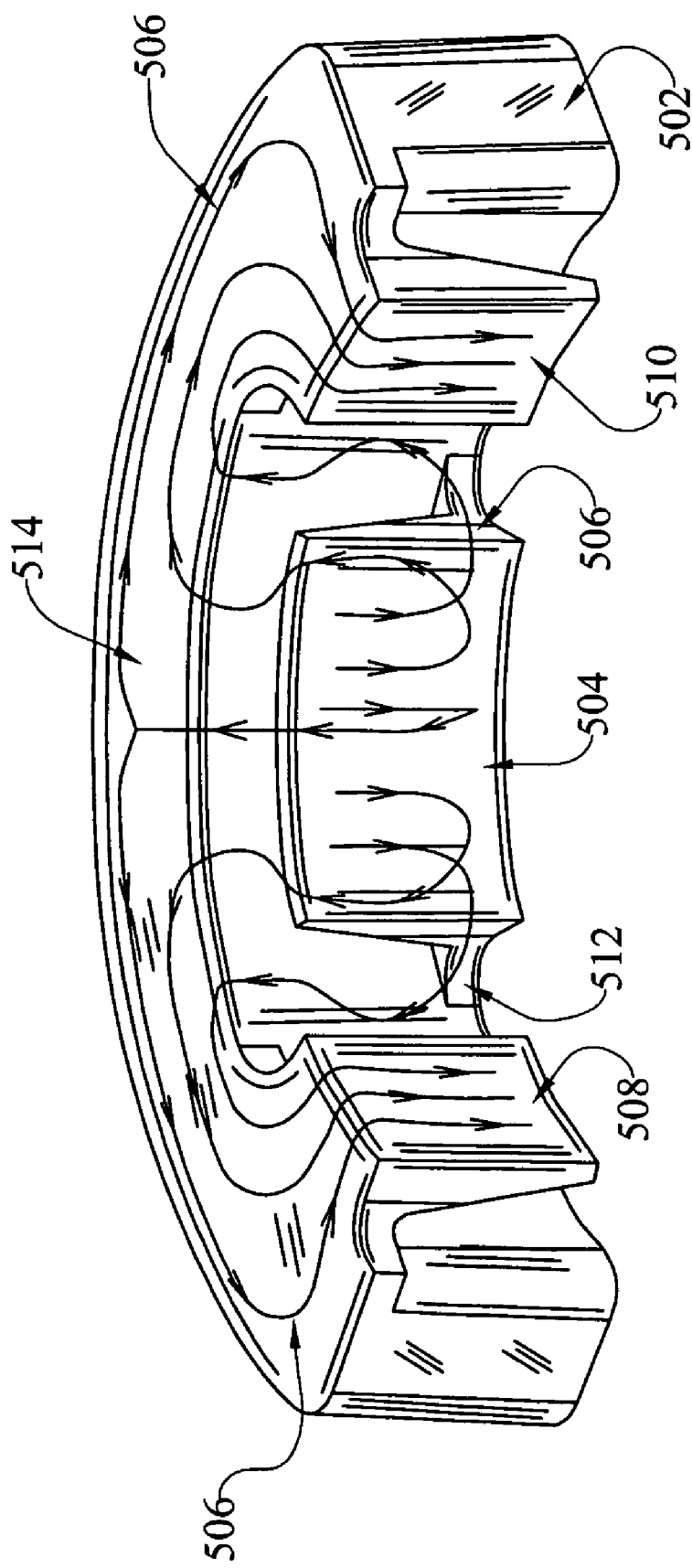
Figure 6:
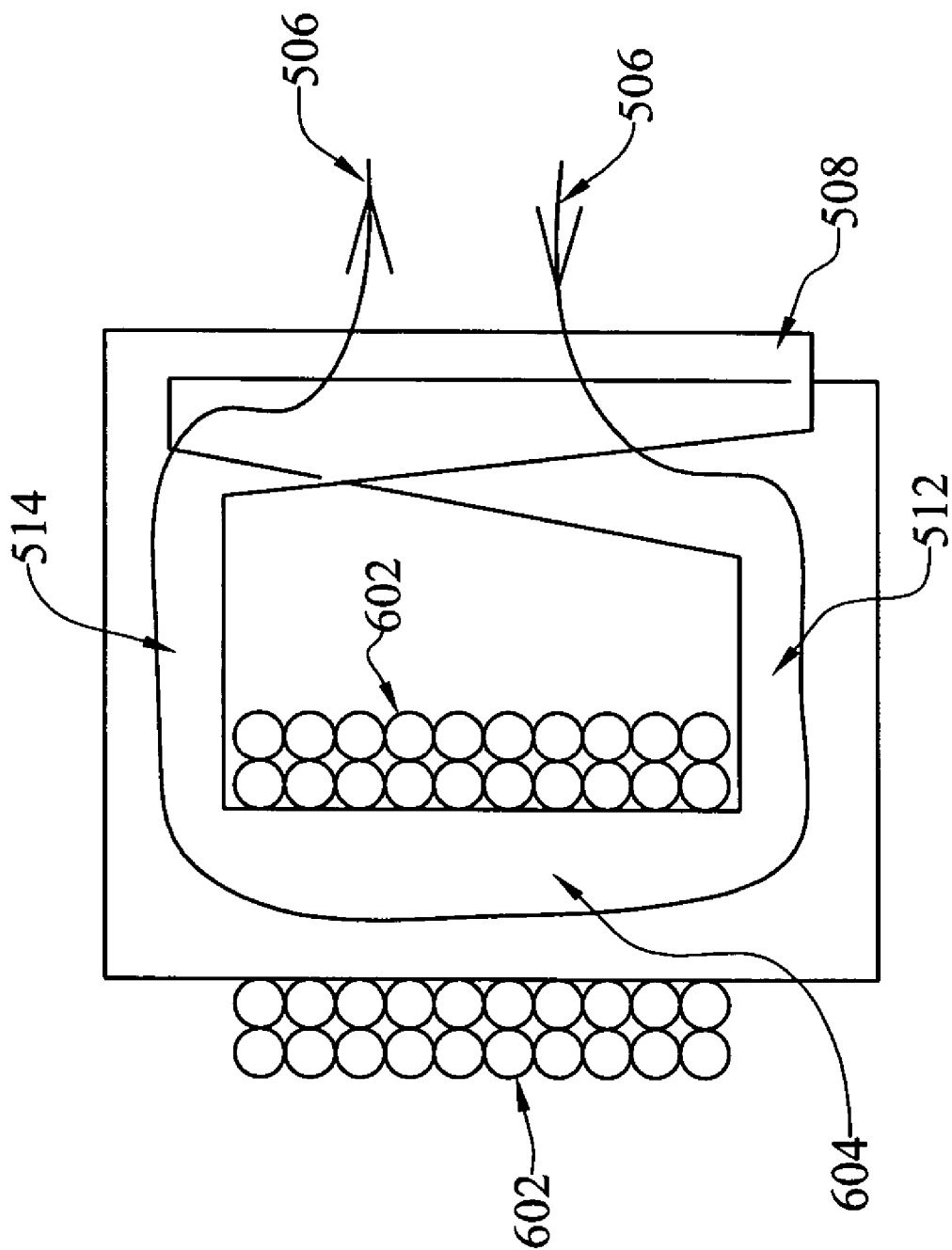
Figure 7:
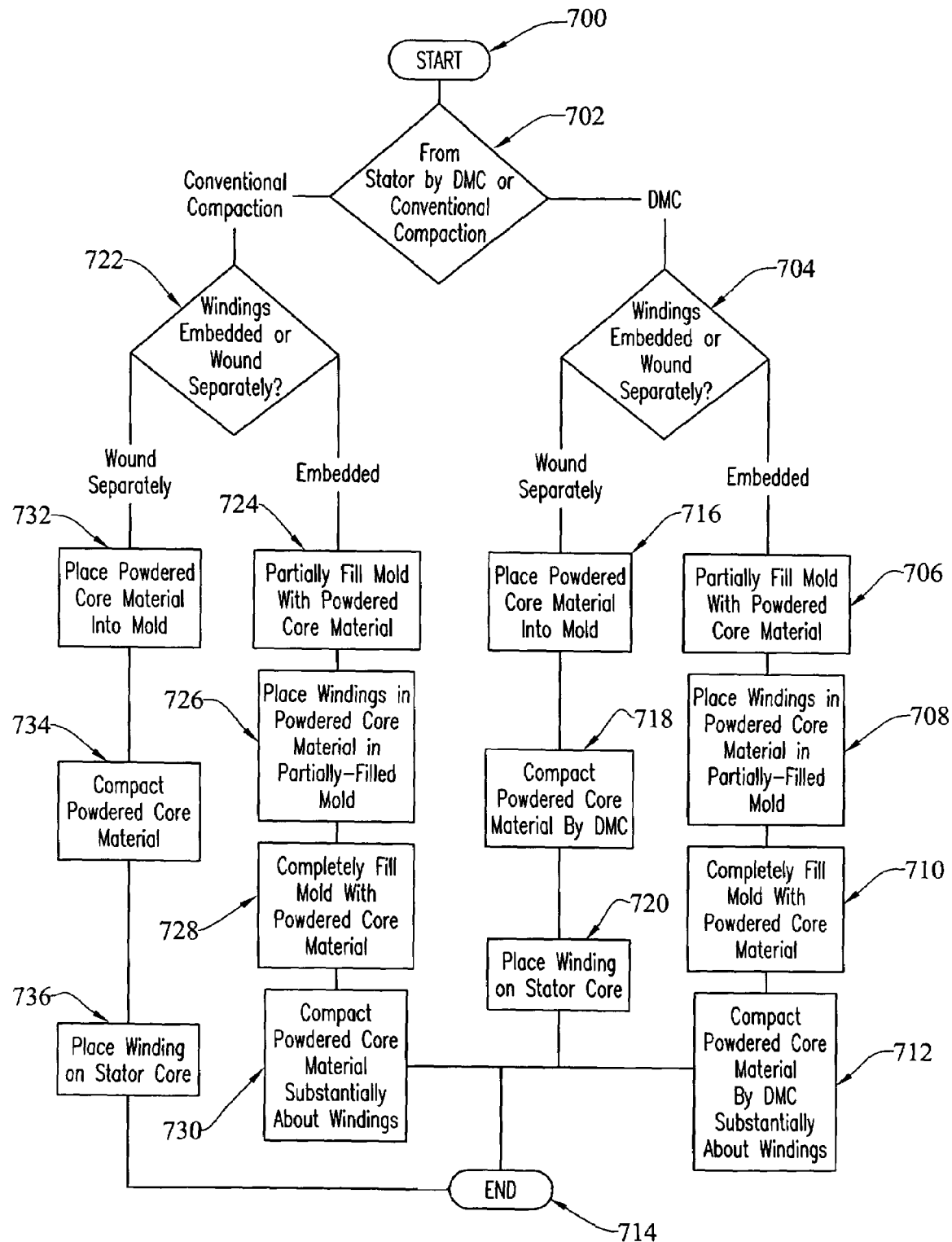

Having thus described the invention in general terms, reference will now be made to the accompanying drawings, which are not necessarily drawn to scale, and wherein:

FIG. 1A is an exploded view of an exemplary dc brushless electric motor with a conventional permanent magnet rotor and a stator of an embodiment of the invention;

FIG. 1B is an exploded view of an exemplary dc brushless electric motor with a DMC rotor and a stator of an embodiment of the invention;

FIG. 2 is perspective view of an embodiment of a segment of the stator of the invention having an arc length of approximately 120 degrees such that three such segments will generally form a complete stator for an electric motor;

FIG. 3A is a top view of the electrical windings of one stator section of a three-section stator for a three-phase permanent magnet motor in an embodiment of the invention;

FIG. 3B is a front view (from the inside diameter of the stator section) of the electrical windings of one stator section of a three-section stator for a three-phase permanent magnet motor in an embodiment of the invention;

FIG. 3C is a top view of the teeth and body of one stator section of a three-section stator for a three-phase permanent magnet motor having a stator with nine slots and a rotor with eight poles, shown without windings, in an embodiment of the invention;

FIG. 3D is a front view of the teeth and body of one stator section of a three-section stator for a three-phase permanent magnet motor having a stator with nine slots and a rotor with eight poles, showing the windings, in an embodiment of the invention;

FIG. 4 is an illustrative view of the stator core, stator windings and rotor, shown in a linear, laid open position;

FIG. 5 is a representative diagram of the magnetic flux path for a portion of a substantially toroidal stator of an embodiment of the invention in which the portion extends about 120-degrees of the stator and is wound with phase windings (not shown) for one electrical phase such that a complete stator for an exemplary three-phase machine would have three such portions with a separate electrical phase wound on each portion;

FIG. 6 is an illustrative section view from an end of the embodiment of the portion of the toroidal stator shown in FIG. 5 shown in a linear fashion, rather than an arc shape; and FIG. 7 is an exemplary flowchart for the process of producing the stator of the invention in an embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The primary operating principle of electric motors is the interaction of the magnetic fields of the stator and the rotor. In a traditional cylindrical stator, the magnetic field of the stator is established in the stator core by currents introduced in the windings in slots about the "teeth" of the core of the stator member in a manner such that they effect a pseudo rotation of the magnetic field about the inner circumference of the stator. The rotor is caused to physically rotate by the pseudo rotation of the magnetic field of the stator as the magnetic poles of the rotor are attracted to the opposite magnetic poles of the stator's magnetic field and repelled by the like poles of the stator's magnetic field. In the vast majority of electric motors today, the stator member is cylindrical in shape and substantially encompasses the rotor. In these electric motors, the stator member is generally comprised of a magnetic core material forming a number of "teeth" and "slots" that are parallel to the axis of the rotor. The magnetic field of the stator member is established by windings in the slots around the teeth of the stator member. The magnetic field of the stator member thus established is two-dimensional in a plane perpendicular to the axis of the motor. The stator member is generally formed of thin laminations to reduce losses due to induced eddy currents within the stator. These thin laminations form a two-dimensional path for magnetic flux induced by the windings of the stator. This flux generally flows in a path perpendicular to the axis of the rotor from the stator and into the rotor, or from the rotor and into the stator.

The embodiments of this invention provide a stator member having a magnetic field that is generally three-dimensional. The stator's magnetic field is three-dimensional in that in addition to the magnetic field of the stator being generally perpendicular to the axis of the rotor, it is also generally parallel to the rotor's axis. The stator flux path of the embodiments of the stator invention is somewhat toroidal rather than the previously described planar path of conventional stators.

In one embodiment, insulated ferrite powders or powdered soft magnetic composite (SMC) materials are used to form the core material of the stator in order to provide the desired shape for the stator and to better control eddy current losses. It would be difficult to form a toroidal flux path in a stator constructed of insulated steel laminations. The use of powdered magnetic materials allows for the formation of optimal shapes in the magnetic circuit, such as the teeth. In one embodiment, the stator of the present invention is formed by dynamic magnetic compaction (DMC).

The DMC process is applied herein to form the stator member of a brushless dc motor. The DMC stator of the present invention is produced such that it can be used with various types of rotors such as, for example, DMC rotors or conventional rotors including spoke-type, surface magnet, ring magnet, imbedded magnet, consequent pole, and can-stack stepper-style rotors.

Compacting a powdered core material and then attaching insulated windings to the compacted shape may produce embodiments of the stator. In some embodiments, the powdered core material may be insulated. Other embodiments of the stator may also be produced by placing the insulated conductor windings into a compaction die or mold, filling the die with the powdered core material, and embedding the windings into the iron during compaction. Either process can produce full 360-degree stator rings or produce shorter arc segments, which can be used as-is or can be assembled to form longer arcs, up to a full 360-degree stator. The conductor windings are generally standard magnet wire as is available from a number of vendors, including Rea Magnet Wire Company, Inc. of Fort Wayne, Ind. The insulated powder is generally an SMC material, but also may be a nano-powder, as are known in the art.

Physical dimensions of embodiments of the stator, such as tooth widths and thickness and yoke thickness, can be adjusted for the design of the accompanying rotor. For instance, in some embodiments the stator may be utilized with a permanent magnet rotor. These permanent magnets are comprised of permanent magnet materials such as ferrites, samarium cobalt, neodymium-iron-boron, exchange-spring nano-powders, or combinations thereof as such materials are available from, for example, Magnequench, Inc. of Indianapolis, Ind.

The number of electrical phases of the embodiments of the invention is not limited and the invention may be used to produce motors having stator windings of single-phase, two-phase, three-phase, five phase or any other viable number of phases.

Brushless dc motors are well known in the art. A brushless dc motor 100, 112 such as that shown in FIGS. 1A and 1B is comprised of a stator member 102 and a rotor member 104, 106 that are joined by a bearing 108 and end plate 110 system. FIG. 1A is an exploded view of an exemplary dc brushless electric motor 100 with a conventional permanent magnet rotor member 104 and a stator member 102 of one embodiment of the invention. FIG. 1B is an exploded view of an exemplary dc brushless electric motor 112 with a DMC rotor member 106 and a stator member 102 of one embodiment of the invention.

FIG. 2 is perspective view of an embodiment of a segment of the stator of the invention. Generally, three such segments will form a complete stator for an electric motor. This segment 200 is comprised of a core 202 and an electrical winding 204. The core 202 is formed of compacted metallic powder. In some embodiments, the metallic powder is insulated so as to reduce eddy-current losses in the core 202. This particular core 202 has three teeth 206, 208, 210 that provide a path for magnetic flux coming from or going to the magnetic field of the rotor. The conductors of the electrical winding 204 are electrically insulated from the core 202 and from adjacent conductors that form the winding 204. A magnetic field is induced in the core 202 by electrical current flowing through the winding 204. Each segment 200 will be wound with a single electrical phase, so if this was a three-phase machine it may have three identical segments 200, the first segment may be connected to electrical phase A, the second segment connected to electrical phase B, and the third segment connected to electrical phase C. A complete stator formed of three such segments 200, for example, will have nine teeth and the rotor for this machine will have either eight or ten magnetic poles.

FIGS. 3A, 3B, 3C and 3D illustrate one section of a three-section stator for a three-phase dc brushless motor having a stator with nine slots and a rotor with eight poles in an embodiment of the invention. FIG. 3A is a top view of the windings 302 of the embodiment. Referring to FIGS. 3B and 3C, each section 304 of the stator is wound with windings 302 of the same electrical phase. For instance, in a three-phase machine as described in FIGS. 3A, 3B, 3C and 3D, one section 304 (that forms a 120 degree arc in this embodiment) of the stator is wound with phase A, another section is wound with phase B, and a third is wound with phase C, with each phase, in this instance, being 120 degrees electrically apart. The three sections are fitted together to form a complete, 360-degree stator.

Referring to FIGS. 3C and 3D, each section 302 of the stator has a number of teeth 306, 308, 310. Teeth form magnetic poles for magnetic flux flowing into and out of the stator section 304. As shown in FIG. 4, for illustrative purposes, the stator 402, stator windings 404, 406, 408 and rotor 410 are shown in a linear, laid open position. The stator windings 404, 406, 408 of this embodiment are supplied power from three separate electrical phases, with each phase having voltages and currents that are 120 degrees electrically apart from the voltages and currents of the other two phases. The stator 402 of this embodiment is comprised of nine teeth 412. The rotor 410 of this embodiment is comprised of eight magnetic poles 414. In other three-phase embodiments, various other stator slot (a/k/a teeth) and rotor pole combinations may be employed. Slot/pole combinations may be determined by the following formulae:

Number of Slots=(6×n)−3, where n=1, 2, 3, . . .

Number of Poles=(6×n)−4, where n=1, 2, 3, . . .

Alternatively, the number of poles can be determined by the formula: Alternative Number of Poles=(6×n)−2, where n=1, 2, 3, . . . Other even number of pole counts can be used for any given number of slots, but motor performance may be reduced. For instance, as shown in Table 1, in a three-phase embodiment of the invention, the following slot/pole combinations are feasible:

TABLE 1

| N | Stator Slots | Rotor Poles | Alternate Poles |
|---|---|---|---|
| 1 | 3 | 2 | 4 |
| 2 | 9 | 8 | 10 |
| 3 | 15 | 14 | 16 |
| 4 | 21 | 20 | 22 |
| . | . | . | . |
| . | . | . | . |
| . | . | . | . |

Because of the three-dimensional or toroidal magnetic path of the embodiments of the present invention, the use of insulated steel laminations is generally not practicable in forming the stator. Such steel laminations are designed to prevent the flow of magnetic flux between adjacent laminations, preferably directing the flux in a two-dimensional direction perpendicular to the axis of the rotor. This design helps reduce eddy-current losses in traditional stators. Insulated ferrite powders or powdered soft magnetic composite materials are used to form the core material of the embodiments of the stator of the present invention in order to better control eddy-current losses. The use of powdered magnetic materials also allows for the formation of optimal shapes in the magnetic circuit, such as the teeth. In one embodiment, the stator of the present invention is formed by dynamic magnetic compaction.

The process of dynamic magnetic compaction has been described in existing references, including U.S. Pat. No. 6,273,963, and other patents previously incorporated herein. The stator may be used in dc brushless motors with conventional rotor members or with rotor members that are also produced by DMC techniques.

An electric motor has a rating generally known as a torque constant, $K_t$. The torque constant is a number representing the relationship between motor input current and motor output torque. Typically, torque constant is expressed in units of torque/amp. The torque constant of an electric motor is proportional to the number of stator winding turns that are "cut" by the magnetic flux from the magnetic field of the rotor. Magnetic flux is proportional to the width or "pitch" of the poles of the rotor and the "pitch" of the "teeth" of the stator. For example, consider the example of a three-phase, eight-pole, nine-slot permanent-magnet dc electric motor having an embodiment of the stator of the invention (a "toroidal stator"). This embodiment of the toroidal stator is comprised of three phases, each phase having three teeth, one full tooth (45 degree arc length) and 2 half teeth (22.5 degree arc length, each), on a per-phase basis. A similar motor having a stator comprised of standard insulated laminations may utilize three partially pitched teeth per phase at a typical pitch of 38 degrees or effectively 38/45 or 0.844. The magnetic flux in a stator's tooth from the magnetic field of the rotor is proportional to the tooth pitch, so for the three teeth in each phase we have:

| | Effective Pitch of Laminated Stator | Effective Pitch of Toroidal Stator |
|---|---|---|
| Tooth #1 | .844 | .50 |
| Tooth #2 | .844 | 1.00 |
| Tooth #3 | .844 | .50 |
| Total | 2.533 | 2.00 |

The flux per phase and hence for the entire toroidal stator motor is reduced to about 2.00/2.533 or 79% of the flux in the laminated stator motor. To compensate, the number of winding turns is increased in the toroidal stator motor by approximately 1/0.79 or 27%. Because of the additional windings of the toroidal stator motor, the wire size used in the windings must be increased to maintain winding resistance approximately equivalent to that of the windings of a laminated stator motor. Generally, the windings will be increased by about one size, American Wire Gauge (AWG). This requires an increase in winding area of the toroidal stator of approximately 1.27×1.26, or 60%. The actual available winding area of the toroidal stator is approximately twice that of the laminated stator. The toroidal stator design of this exemplary motor has one coil per phase while the laminated stator design requires three coils per phase, one for each tooth.

The additional winding area of the toroidal stator allows windings of even larger wire gage to be used. For instance, the winding wire may be increased in size by up to about two sizes AWG over the size of the winding wire used in a traditional laminated stator. While using approximately all of the winding area of the toroidal stator, this increased winding wire size reduces the winding resistance by approximately 26% below that of the windings of the laminated stator.

A motor constant is used to compare the motor performance of dissimilar motors. Motor constant is a relative figure of merit that allows you to compare the relative performance of motors that are difficult to compare. The motor constant is proportional to the motor performance so that a motor with a motor constant that is higher than the motor constant of another will have better performance characteristics such as, for example, motor efficiency, output, cooler operating temperature, etc.

The motor constant, $K_m$, is calculated by dividing the torque constant, $K_t$, by the square root of the winding resistance. With an equivalent Kt and 26% lower resistance, the motor having a toroidal stator generally has a higher motor constant, Km, by about 12% over a similar motor having a laminated stator.

The above example is generally applicable to a three-phase, eight-pole motor. However, other embodiments of the stator of the invention can accommodate electric motors having various other combinations of phases, poles, teeth per phase, and stator arc segments. For example, the number of phases may be any integer number (e.g., 1, 2, 3, . . . ), the number of poles may be any integer multiple of two (e.g., 2, 4, 6, 8, . . . ), the number of teeth per phase may be any integer number (e.g., 1, 2, 3, . . . ), and the number of stator arc segments is generally equal to the number of phases (e.g., if there are three phases, then there are generally 3 stator arc segments). To make the numbers relevant to motors with another pole count, for example, the angle should be converted to percent of full pitch. For a 4-pole motor, for example, full pitch would be 90 degrees. Each of the three phases of a motor having a toroidal stator of the invention has the same number of teeth.

FIG. 5 is a representative diagram of the flux path for a portion of a substantially toroidal stator of an embodiment of the invention. The embodiment shown in FIG. 5 is a 120 degree portion 502 of a three-phase stator on which one electrical phase is wound (the phase winding is not shown for clarity). A complete three-phase embodiment of this stator would have three such portions 502 with a separate electrical phase wound on each portion. Other embodiments may have more, or fewer, portions, with arc lengths smaller or greater than 120 degrees, respectively, so that the completed stator forms an approximately 360 degree ring and may have more, or fewer phase windings. The embodiment shown in FIG. 5 has three teeth on its 120-degree portion; therefore, it has three teeth per phase. Other embodiments may have more or fewer teeth. The center tooth 504 is shown as a magnetic south pole with the magnetic flux 506 (from the rotor) going into it and the outside teeth 508, 510 would then each be magnetic north poles with the flux exiting each pole 508, 510 and generally going into the rotor. The flux 506 travels a generally spiral or toroidal route from the point that it enters the center tooth 504 until it exits the outside teeth 508, 510. While traveling this route, the flux 506 will travel perpendicular to the axis, in a circumferential direction, and axially to an associated rotor, thus following a three-dimensional path. The flux 506 shown in FIG. 5 will change directions (thus changing the magnetic alignment of the teeth 504, 508, 510) depending upon the direction of the current in the windings.

FIG. 6 is generally a section view from an end of the embodiment of the portion of the toroidal stator shown in FIG. 5. However, in FIG. 6, the section view is of a segment not formed in an arc shape, but rather formed in a linear fashion. This embodiment has the same flux pattern as the embodiment of FIG. 5, but has only one outside (north pole) tooth 508 shown. In this view, the electrical windings 602 of the stator segment are shown. The current that travels through these windings 602 is all the same phase.

The flux 506 shown in FIGS. 5 and 6 flows from the magnetic field of the rotor (not shown), across a small air gap and into the middle tooth 504. The flux 506 generally travels down the tooth 504 and across the bottom portion 512 of the stator segment 502. The flux 506 then turns up and travels through the center 604 of the windings 602 to the top portion 514 of the stator segment 502 where it travels across the top 514 to the outside teeth 508, 510. The flux 506 flows down the outside teeth 508, 510 and crosses the air gap back to the rotor. The teeth 504, 508, 510 are tapered so that the flux density in the teeth 504, 508, 510 remains somewhat constant. The shape of the stator segment 502 allows a single electrical winding 602 to be wound on each segment 502 thereby providing the necessary north or south magnetic alignment in each tooth 504, 508, 510 of a segment 502, as such magnetic effect is induced, by the substantially toroidal flux path.

Compacting a powdered core material by DMC substantially in the desired shape may produce the stator of some embodiments of the invention. The powdered core material is generally a soft iron material such as, for example, soft magnetic composites (SMC) as are available from Höganäs AB and Quebec Metal Powders, Ltd. of Montreal, Quebec (QMP), and Atomet TM powders available from QMP, although other types of core material may be used.

One method of producing a stator using DMC techniques involves placing one or more powdered materials in one or more chambers circumferentially surrounding a center conductor. The inner walls (closest to the center conductor) of the chambers are electrically conductive and are either deformable such that they may crush radially outwardly (away from the center conductor), or are moveable such that they are mechanically able to move radially outwardly. The conductive chamber walls are then exposed to a magnetic field created by a current pulsed through the center conductor. The magnetic field creates an outwardly radial pressure on the chamber walls thereby compacting the one or more powdered materials contained therein and forming a solid from the powdered materials. These procedures are more fully explained in the referenced patents previously incorporated herein.

Another method of producing a stator using DMC techniques involves placing one or more powdered materials in one or more chambers that are circumferentially surrounded by a conductor. The outer walls (closest to the conductor) of the chambers are electrically conductive and are either deformable such that they may crush radially inwardly (away from the conductor), or are moveable such that they are mechanically able to move radially inward. The conductive chamber walls are then exposed to a magnetic field created by a current pulsed through the conductor. The magnetic field creates an inward radial pressure on the chamber walls thereby compacting the one or more powdered materials contained therein and forming a solid from the powdered materials. These and other procedures of forming shapes through DMC are more fully explained in the referenced patents previously incorporated herein.

Other embodiments of the toroidal stator of the invention may be formed by conventional compaction techniques. The powders that form the stator are placed in one or more chambers and pressure is applied to the chambers to compress the powders contained therein and form a solid shape.

The process of forming an embodiment of the toroidal stator of the invention is more fully described in the flowchart of FIG. 7. The process begins with Step 700. In Step 702 it is determined whether the stator will be formed by DMC or by conventional compaction techniques. If it is determined that the stator will be formed by DMC, then in Step 704, it is determined whether the stator windings will be embedded in the core material of the stator or if they will be wound separately about the stator core after the core is formed. If they will be embedded, then in Step 706 a mold that has conductive walls that are capable of moving radially outward or inward when exposed to a magnetic field is partially filled with the powdered core material. In Step 708, the insulated electrical windings are placed in the powdered core material in the partially-filled mold. In Step 710, the mold is completely filled with the powdered core material thereby substantially surrounding the embedded windings. In Step 712, the powdered core material is compacted by DMC substantially about the embedded windings. The process then ends at Step 714.

If it is determined in Step 704 that the windings will be wound about the formed stator core, then in Step 716 the powdered core material is placed into a mold that has conductive walls that are capable of moving radially outward or inward when exposed to a magnetic field. In Step 718, the powdered core material is compacted by DMC. In Step 720, the formed stator core is removed from the mold and has electrical windings placed upon it. The process then ends at Step 714.

If it is determined in Step 702 that the stator will be formed by conventional compaction techniques, then in Step 722, it is determined whether the stator windings will be embedded in the core material of the stator, or if they will be wound separately about the stator core after the core is formed. If they will be embedded, then in Step 724 a mold that has walls that are capable of moving either inwardly or outwardly when exposed to a mechanical force is partially filled with the powdered core material. In Step 726, the insulated electrical windings are placed in the powdered core material in the partially-filled mold. In Step 728, the mold is completely filled with the powdered core material thereby substantially surrounding the embedded windings. In Step 730, the powdered core material is compacted by the mechanical force substantially about the embedded windings. The process then ends at Step 714.

If it is determined in Step 722 that the windings will be wound about the formed stator core, then in Step 732 the powdered core material is placed into a mold that has walls that are capable of moving either inwardly or outwardly when exposed to a force. In Step 734, the powdered core material is compacted by the force. In Step 736, the formed stator core is removed from the mold and has electrical windings placed upon it. The process then ends at Step 714.

Once the stator is formed, in some instances it may require additional machining to meet tolerance requirements and it may be sealed with a substance such as, for example, polyurethane, although these additional steps are generally not required.

A stator segment formed by compaction of powdered core materials allows the production of non-conventional shapes such as, for example, the teeth of the stator segments described herein. These complex shapes may facilitate the manufacture as well as the winding of the stator. Furthermore, it would be difficult to produce the described non-conventional shapes in convention stacked-lamination stators without incurring large electrical and magnetic losses. Electric motors utilizing non-conventional shaped stators formed by compaction may have higher torque and motor constants than comparable conventional stator motors. Insulated powders used in compaction manufacturing of stators results in low eddy-current losses. DMC processes allow the compaction of materials up to 98 percent of their theoretical maximum density, thus improving the performance and reducing losses of such DMC produced stators over that of stators formed by conventional compaction techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. The method of forming an electric motor, comprising the steps of:
    forming a plurality of arcuate stator segments, each segment having a concave surface, a convex surface, opposite end surfaces, and a plurality of teeth extending inwardly from said concave surface, a adjacent teeth of said plurality extending in opposite direction;
    providing a separate electrical winding for each segment, each winding having different portions that are arranged adjacent said concave, convex and end surfaces of the associated segment said winding being adapted to be selectively energized to form a three-dimensional magnetic field about said segment;
    assembling said segments to form an annular stator; and
    placing a rotor within said stator, said stator having at least two magnetic poles that are arranged to interact with the magnetic field in said stator.

2. The method as set forth in claim 1 wherein said winding is embedded within the associated stator segment.

3. The method as set forth in claim 1 wherein said winding is mounted on the associated stator segment.

4. The method as set forth in claim 1 wherein said rotor has a permanent magnet, and wherein said magnetic poles on said rotor are created by the poles on said magnet.

5. The method as set forth in claim 1 and further comprising the additional step of:
    supplying a single phase current to each stator winding that is different from the phase of the current supplied to the winding of each adjacent segment.

* * * * *